US 11,391,541 B1

(12) United States Patent
Kennedy et al.

(10) Patent No.: US 11,391,541 B1
(45) Date of Patent: Jul. 19, 2022

(54) SIGHTING APPARATUS AND SYSTEM WITH ADJUSTABLE RETICLE

(71) Applicants: Mickey M. Kennedy, Medina, OH (US); Han-Che Chen, Taipei (TW)

(72) Inventors: Mickey M. Kennedy, Medina, OH (US); Han-Che Chen, Taipei (TW)

(*) Notice: Subject to any disclaimer, the term of this patent is extended or adjusted under 35 U.S.C. 154(b) by 0 days.

(21) Appl. No.: 17/506,214

(22) Filed: Oct. 20, 2021

Related U.S. Application Data

(63) Continuation-in-part of application No. 63/212,888, filed on Jun. 21, 2021.

(51) Int. Cl.
*F41G 1/30* (2006.01)
*F41G 1/38* (2006.01)
*G06F 3/04847* (2022.01)
*G06F 3/04842* (2022.01)

(52) U.S. Cl.
CPC .............. *F41G 1/30* (2013.01); *F41G 1/38* (2013.01); *G06F 3/04847* (2013.01); *G06F 3/04842* (2013.01)

(58) Field of Classification Search
CPC .......... F41G 1/30; F41G 1/38; G06F 3/04847; G06F 3/04842
USPC ........................................................ 42/122
See application file for complete search history.

(56) References Cited

U.S. PATENT DOCUMENTS

| | | | | |
|---|---|---|---|---|
| 8,857,714 | B2 * | 10/2014 | Benson | F41G 1/38 235/407 |
| 11,087,512 | B2 * | 8/2021 | Hoffman | G09G 5/14 |
| D936,169 | S * | 11/2021 | McKillips | D22/109 |
| D949,275 | S * | 4/2022 | York | D22/109 |
| 2015/0323780 | A1 * | 11/2015 | Hamilton | G02B 25/001 359/428 |
| 2020/0049455 | A1 * | 2/2020 | Hamilton | G02B 23/04 |

FOREIGN PATENT DOCUMENTS

WO  WO-2021168132 A1 *  8/2021  ............... F41G 1/30

* cited by examiner

*Primary Examiner* — Samir Abdosh
(74) *Attorney, Agent, or Firm* — Dale J. Ream

(57) ABSTRACT

An electronic sighting apparatus is programmed or configured to stretch or adjust a reticle as part of a set up or calibration process using a dedicated input button on an electronic scope.

18 Claims, 6 Drawing Sheets

SIGHTING APPARATUS AND SYSTEM WITH ADJUSTABLE RETICLE

REFERENCE TO RELATED APPLICATIONS

This application claims the benefit of Provisional patent application U.S. 63/212,888 filed Jun. 21, 2021 titled Hunting Sight with Adjustable Reticle, which is incorporated herein in its entirety.

BACKGROUND OF THE INVENTION

This invention relates generally to sighting devices for use in hunting and, more particularly, to an electronic sighting system and apparatus programmed or configured to adjust an on-screen reticle. In addition, the sighting device is easily mounted on bow hunting equipment and on rifles such that the technology of this invention is available to both types of hunting equipment.

Every hunter knows that the importance of the sighting device installed on his shooting device, whether that shooting device is a rifle, a handgun, a crossbow, a compound bow, or the like. With greater frequency and certainly for long distance firing, electronic sighting devices or scopes may be used. And, for the truly serious shooter, electronic and multi-functional sighting devices are becoming common. For example, scopes having electronic rangefinders, zoom features, infrared lighting, and more is sometimes included.

Although presumably effective for their intended purposes, the existing devices and patent proposals do not provide necessary attention to one of the most important aspects to accurate sighting and, therefore, hunting—the reticle. The reticle is the aiming point in the field of view in most rifle scopes. Also referred to as 'crosshairs,' reticles are either glass etched or, most commonly, made out of wire. The purpose of reticles is to give a hunter a centralized aiming point. Each reticle can be designed to cater to different shooting activities, hunting conditions, and even various types of targets. For example, there are reticles for:
  Varmint hunting
  Hog/pig hunting
  Bullet drop compensation
  Laser range finding
  Low light shooting
  Tactical reticles
  General hunting reticles
  Illuminated reticles
And, more particularly, some reticles provide horizontal lines that are associated with specific long-distances so that the hunter can use those lines as sites if the target is farther away. During calibration or prior to a hunt, the existing devices do not adequately provide a capability for the hunter to adjust or "stretch" the horizontal lines to specific distances as may be desired using the electronic sighting device. In other words, a hunter may desire to change and adjust the appearance of the reticle inn real time according to perceived conditions.

Therefore, it would be desirable to have an electronic sighting apparatus and system for electronically adjusting a reticle. Further it would be desirable to have an electronic sighting apparatus and that is easy to mount or release from a rifle, crossbow, or the like. In addition, it would be desirable to have an electronic sighting apparatus and system that is easy to calibrate.

SUMMARY OF THE INVENTION

An electronic sighting apparatus capable of selective attachment to a hunting implement includes a casing defining an interior area and an eye hole that enables a hunter to look through said interior area and a viewing lens opposite said eye hole. An input assembly may be coupled to an exterior wall of said casing and an electronic display situated in said interior area. Further, a processor is in data communication with said electronic display and said input assembly for executing program code and a non-transitory computer-readable storage medium containing the program code executable by the processor to perform the steps of displaying a current virtual reticle on an electronic display of the electronic device and, subsequently, receiving a request to adjust said published current virtual reticle, e.g., during it setup or calibration operation. The processor may also be configured for receiving first input data indicative of a user selection of a selectable portion of said published current virtual reticle and receiving second input data indicative of adjusting a configuration of said current virtual reticle. More specifically, the first input data may enable a user to select a particular sighting line of the reticle (also referred to as a tick mark) and the second input data may be to request that a selected sighting line be "stretched" downwardly relative to an upwardly adjacent sighting line as will be described in more detail below. It will be appreciated that more than one sighting line may be selected sequentially and adjusted as the scope is being calibrated to indicate where a shooter should aim when shooting a target as a predetermined distance. The adjusted reticle may then be published in real time on the electronic display and replacement of the originally displayed virtual reticle.

Therefore, a general object of this invention is to provide an electronic sighting apparatus and system that is programmed or configured to stretch or adjust a reticle as part of a set up or calibration process.

Another object of this invention is to provide an electronic sighting apparatus, as aforesaid, that enables a user to adjust a reticle in real time using a dedicated input button on an electric device.

Still another object of this invention is to provide an electronic sighting apparatus, as aforesaid, that is easily mountable on shooting devices such as a rifle, a handgun, a cross bow, or the like.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 1b is a rear perspective view of the electronic sighting device as in FIG. 1a;

FIG. 2a is a top view of the electronic sighting device as in FIG. 1a;

FIG. 2b is a sectional view taken along line 2b-2b of FIG. 2a;

FIG. 2c is an isolated view on an enlarged scale taken from FIG. 2a;

DESCRIPTION OF THE PREFERRED EMBODIMENT

Figure 1A:
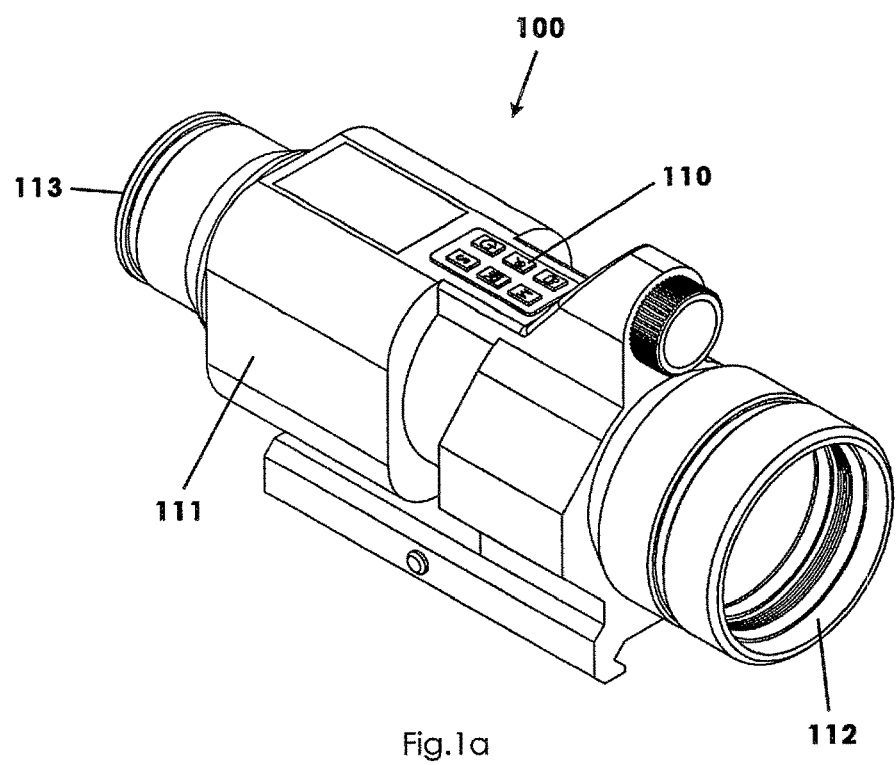
FIG. 1a is a front perspective view of an electronic sighting device capable of attachment to a hunting instrument according to a preferred embodiment of the present invention.
Figure 1B:
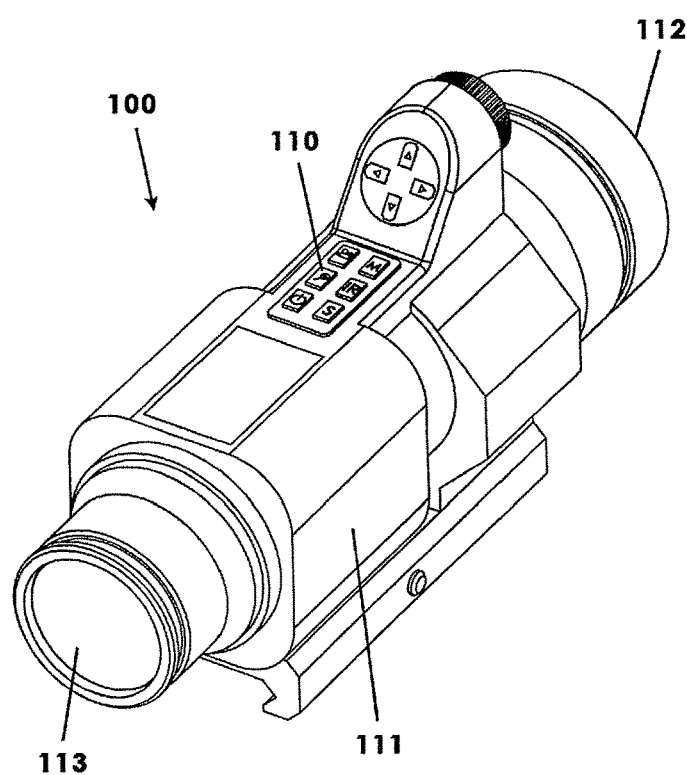
Figure 2A:
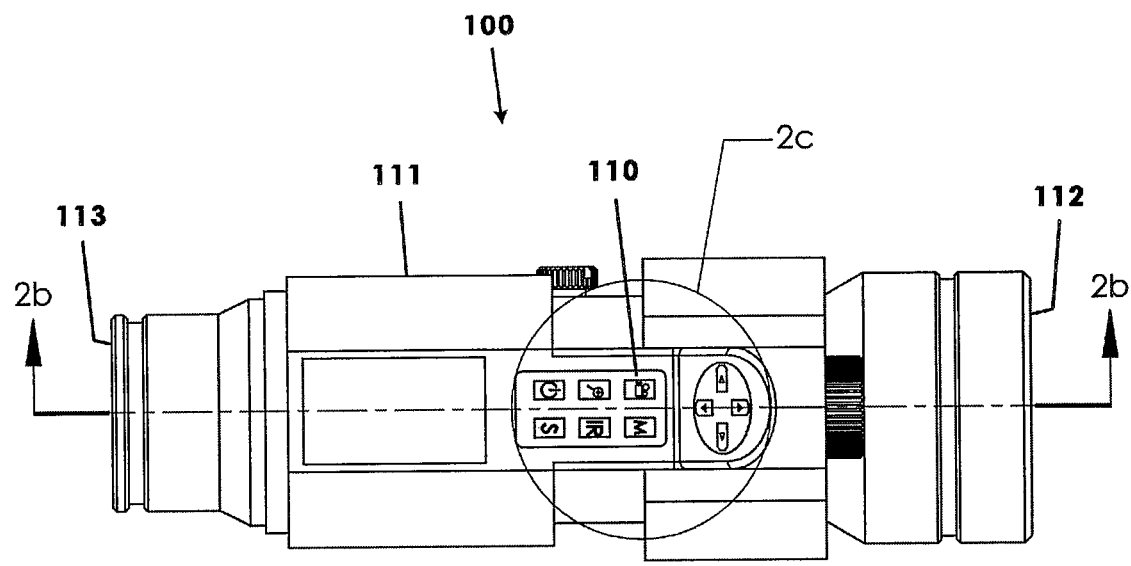
Figure 2B:
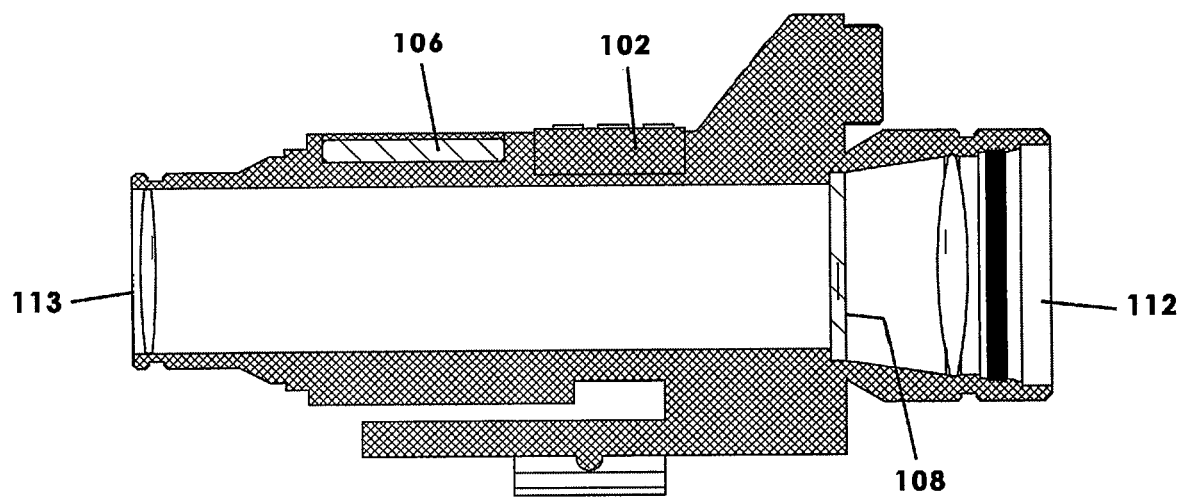
Figure 2C:
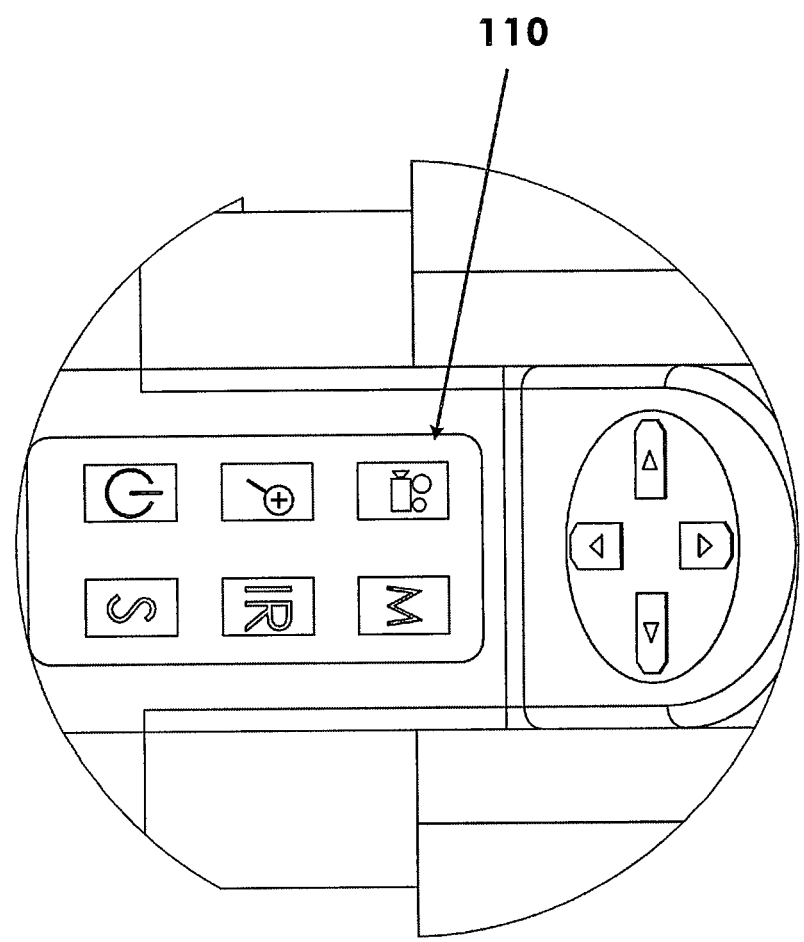
Figure 3A:
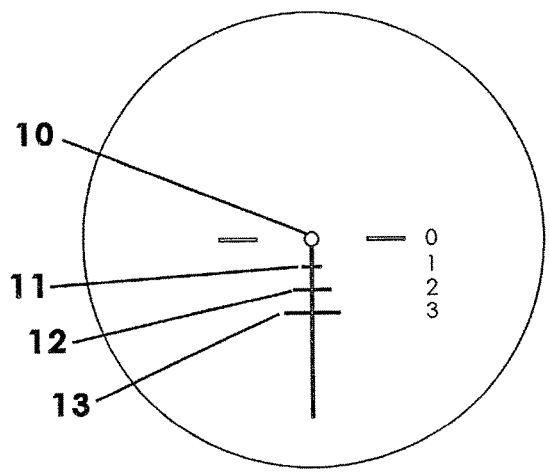
FIG. 3a is an enlarged view of a virtual reticle illustrated in an un-stretched configuration.
Figure 3C:
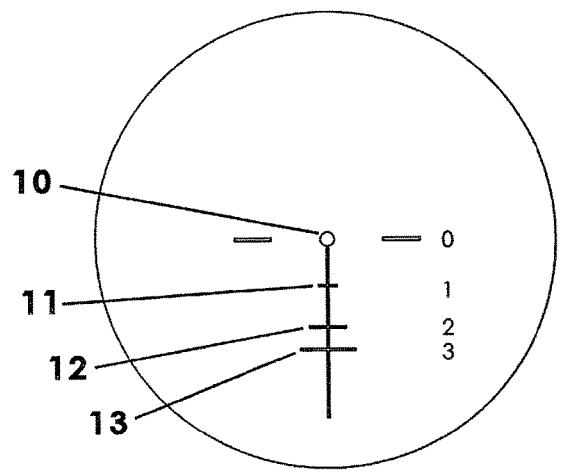
FIG. 3c is an enlarged view illustrated with third and fourth portions further displaced from the second portion of the reticle.
Figure 3B:
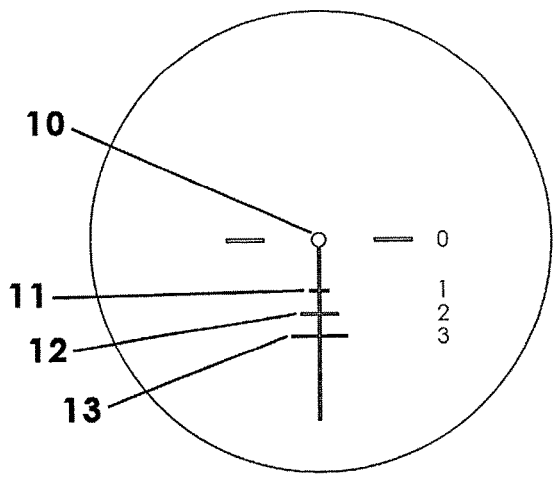
FIG. 3b is an enlarged view of the virtual reticle illustrated with second, third, and fourth reticle portions further displaced from a first portion of the reticle.
Figure 3D:
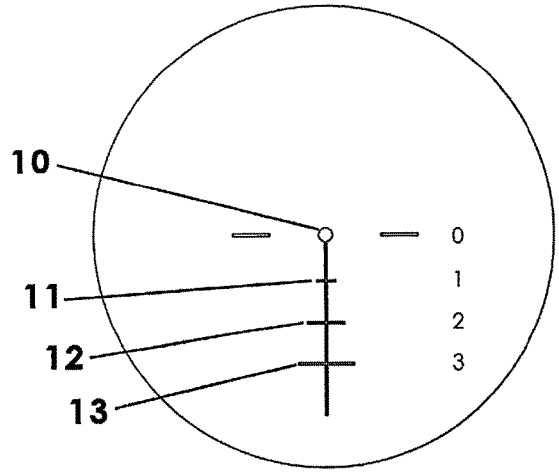
FIG. 3d is an enlarged view illustrated with the fourth portion further displaced from the third portion of the reticle.
Figure 3E:
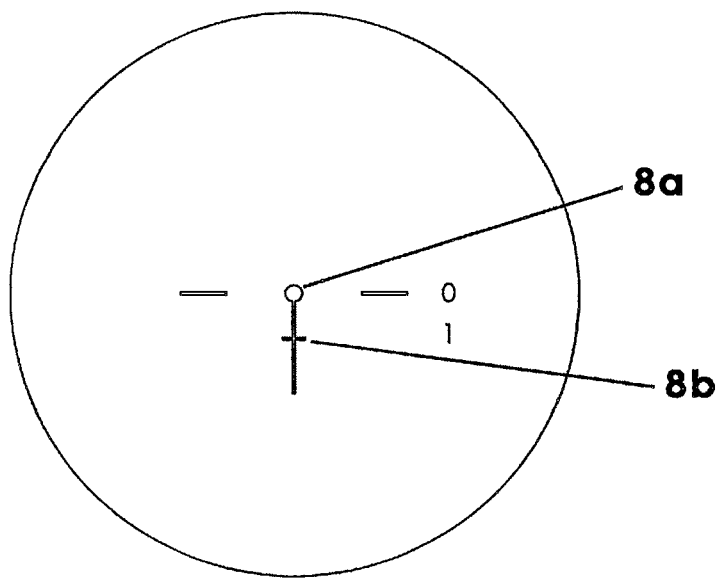
FIG. 3e is an enlarged view of a virtual reticle according to an embodiment only having first and second reticle portions.
Figure 3F:
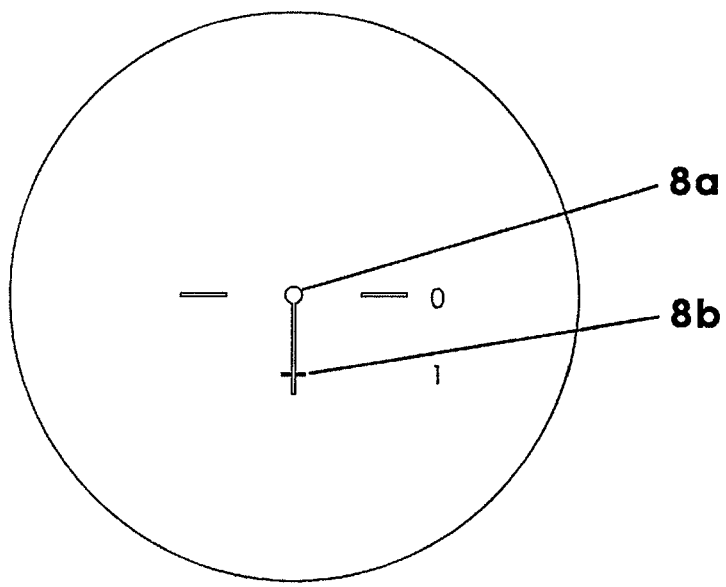
FIG. 3f is an enlarged view of the vertical reticle as in FIG. 3f, illustrated with the second portion being further displaced from the first portion of the virtual reticle.
Figure 4:
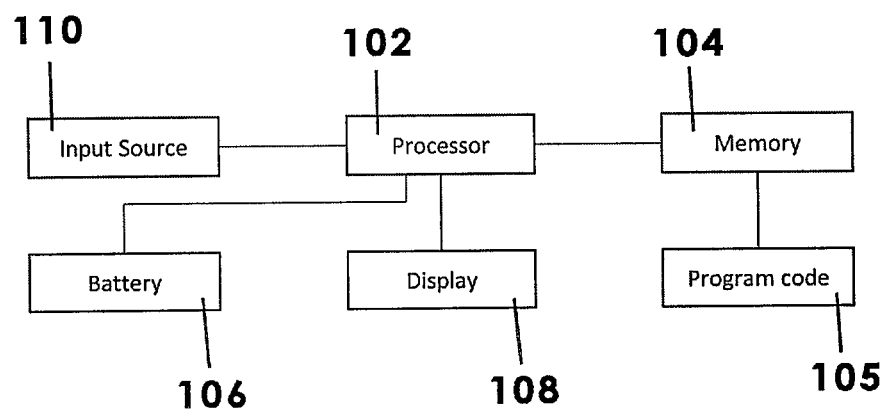
FIG. 4 is a block diagram illustrating the electronic components of the present invention.

An electronic sighting system and apparatus for adjusting a reticle according to a preferred embodiment of the present invention will now be described with reference to FIGS. 1a to 4 of the accompanying drawings.

For context, it will be understood that the present invention may include programming 105 stored in a non-transitory storage element (i.e., a memory 104) and executed by a processor 102 associated with an electronic device 100, such as an electronic scope, that includes a plurality of input buttons 110 that correspond to specific blocks of programming that, when executed, generate certain images published on a display screen 108 indicative a distance to a target and which allow a user to modify the published text or graphics in real time using the input buttons 110. For instance, a user may select an item from a menu or take an action that may result in actuation of specific features of the electronic device 100. The electronic components may be electrically energized using a battery 106.

The electronic device 100 (e.g., a scope) itself includes a housing or casing 111 having a structure that is specifically adapted for a quick release attachment to a rifle, a handgun, a compound bow, a crossbow or the like. In other words, the electronic scope casing 111 may be mounted to a hunting device with bolts, screws, or quick release fasteners. The input buttons 110 may be attached to an outer wall of the casing 111. In a traditional manner, the casing defines an interior area and an eye hole 112 that enables a hunter to view into the interior area and has a viewing lens 113 opposite the eye hole 112. It is understood that the eye hole may include a focus ring that is adjustable by a user to bring the display 108 into focus.

Regarding the present invention, a specific input button 110 may be activated and which is associated with publication of a reticle upon the display 108 of the electronic device 100 as shown in the figures. A sighting device displayed on a transparent display 108 or lens may be referred to as a "virtual reticle" by contrast with a purely mechanical reticle or sighting element. In some embodiments (such as for attachment to a rifle), a virtual reticle may include two portions/\two reticle lines 8a, 8b (FIGS. 3e and 30. In another embodiment and as illustrated in FIGS. 3a to 3d, the reticle 110 may include four portions, namely, horizontal lines 10, 11, 12, 13, each having a particular horizontal width and being labeled 0, 1, 2, and 3, respectively, for clarity in the description below. It is understood that while the first portion 10 is illustrated as a circle, it may be referred to as a first portion 10 or as being the first of a set of horizontal lines. It is also understood that the series of reticle lines may incrementally increase in width. The present invention specifically concerns selecting a respective line under which the remaining lines may be "stretched" downwardly beneath the selected line. It is important to understand that the lines represent distances that a shooter will associate with a downstream target and may be referred to as "sighting lines" or as "sighting indicia" or that the virtual reticle includes a first portion 10 (i.e., a first line), second portion 11 (i.e., a second line), a third portion 12 (i.e., a third line), and a fourth portion 13 (i.e., a fourth line). Each line may have a generally linear and horizontal configuration and is displaced from a previous or subsequent line by a predetermined distance (which becomes critical when a selected portion is selected to be stretched). Making these adjustments of the reticle 110 may be part of the calibration process.

In another aspect, the electronic sighting system may include a rangefinder system that is in data communication with the processor 102, memory 104, and display screen 108 and may be activated by pressing another respective input button of the plurality of input buttons labeled 110. It is understood that a rangefinder system is a type of camera for determining the distance to remote objects, such as to animals that may be targeted through a digital scope mounted to a firearm, crossbow, compound bow, or the like. Preferably, the rangefinder system includes a true distance calculator (TDC). In the present electronic sighting system, therefore, a hunter may toggle between a conventional rangefinder system and the reticle bending system described herein using respective input buttons 110.

In use, a user may depress a respective input button 110 and be allowed to then select a respective distance line shown on the display. If line 0 (depicted by reference numeral 10) is selected and a predetermined input button 110 is activated, then the horizontal lines 11, 12, 13 associated with numerals 1, 2, and 3 will all be repositioned downwardly. Alternatively, if the horizontal line 11 associated with 1 is selected, and the predetermined input button 110 is actuated again, then the horizontal lines associated with portions 2 and 3 will be stretched downwardly. Similarly, if the horizontal line 12 associated with 2 is selected and the predetermined input button 110 is actuated again, then only the horizontal line 13 associated with portion 3 will be stretched downwardly. In this manner, a hunter may calibrate his scope to match the distances he intends to shoot. Stated another way, the selected reticle portion is then displaced further from a respective reticle portion above it and the subsequent portions are moved downwardly but at the same originally predetermined distance of displacement from the portion being stretched.

It is understood that while certain forms of this invention have been illustrated and described, it is not limited thereto except insofar as such limitations are included in the following claims and allowable functional equivalents thereof.

The invention claimed is:

1. An electronic sighting system capable of selective attachment to a hunting device and operable for adjusting a virtual reticle to accurately sight a target includes a processor for executing program code and a non-transitory computer-readable storage medium containing the program code executable by the processor to perform the steps of:

publishing a current virtual reticle on an electronic display of the electronic device;

receiving a request to adjust said published current virtual reticle;

receiving first input data indicative of a user selection of a selectable portion of said published current virtual reticle;

receiving second input data indicative of adjusting a configuration of said current virtual reticle;

determining an adjusted virtual reticle according to said first and said second input data;

publishing said adjusted reticle on said electronic display of the electronic device;

wherein:

said step of receiving first input data includes using an input assembly in data communication with the processor for selecting said first portion or said second portion of said current virtual reticle, respectively;

said step of receiving second input data includes using said input assembly for actuating a stretching of said selected portion of said current virtual reticle.

2. The system as in claim 1, wherein said current virtual reticle includes:

a first portion defining a first aiming point indicative of a first distance to the target;

a second portion displaced a first predetermined distance from said first portion so as to define a second aiming point indicative of a second distance to the target, said second distance being greater than said first distance.

3. The system as in claim 2, wherein said current virtual reticle includes a third portion displaced a second predetermined distance from said second portion so as to define a third aiming point indicative of a third distance to the target, said third distance being greater than said second distance.

4. The system as in claim 3, wherein said current virtual reticle includes a fourth portion displaced a third predetermined distance from said third portion so as to define a fourth aiming point indicative of a fourth distance to the target, said fourth distance being greater than said third distance.

5. The system as in claim 4, wherein:

said first portion of said current virtual reticle includes a first indicium having a horizontal linear configuration;

said second portion of said current virtual reticle includes a second indicium having a horizontal linear configuration;

said third portion of said current virtual reticle includes a third indicium having a horizontal linear configuration; and said fourth portion of said current virtual reticle includes a fourth indicium having a horizontal linear configuration.

6. The system as in claim 1, wherein:

if said first and second input data are indicative that said first portion is selected for stretching, then said determining an adjusted virtual reticle includes further displacing said second portion away from said first portion, again displacing said third portion second predetermined distance away from said second portion, and again displacing said fourth portion said third predetermined distance away from said third portion; and if said first and second input data are indicative that said second portion is selected for stretching, then said determining an adjusted virtual reticle includes further displacing said third portion away from said second portion, and again displacing said fourth portion a third predetermined distance way from said third portion; and if said first and second input data are indicative that said third portion is selected for stretching, then said determining an adjusted virtual reticle includes further displacing said fourth portion away from said third portion.

7. The system as in claim 4, wherein:

said second portion of said current virtual reticle is downwardly spaced apart from said first portion of said current electronic reticle;

said third portion of said current virtual reticle is downwardly spaced apart from said second portion of said current electronic reticle; and said fourth portion of said current virtual reticle is downwardly spaced apart from said third portion of said current electronic reticle.

8. The system as in claim 5, wherein:

said first indicium includes a first tic mark;

said second indicium includes a second tic mark;

said third indicium includes third tic mark; and said fourth indicium includes fourth tic mark.

9. The system is claim 1, wherein said input assembly includes a plurality of input buttons mounted to a scope casing, said plurality of input buttons including a button in communication with the processor for determining said first input data and said second input data.

10. An electronic sighting apparatus capable of selective attachment to a hunting implement, said sighting device comprising:

a casing defining an interior area and an eye hole that enables a hunter to view said interior area and a viewing lens opposite said eye hole;

an electronic display situated in said interior area;

an input assembly coupled to an exterior of said casing;

a processor in data communication with said electronic display and said input assembly for executing program code and a non-transitory computer-readable storage medium containing the program code executable by the processor to perform the steps of:

publishing a current virtual reticle on an electronic display of the electronic device, said current virtual reticle including a first portion defining a first aiming point indicative of a first distance to the target and including a second portion downwardly displaced a first predetermined distance from said first portion so as to define a second aiming point indicative of a second distance to the target;

receiving a request to adjust said published current virtual reticle;

receiving first input data indicative of a user selection of a selectable portion of said published current virtual reticle;

receiving second input data indicative of adjusting a configuration of said current virtual reticle;

determining an adjusted virtual reticle according to said first and said second input data;

publishing said adjusted reticle on said electronic display of the electronic device;

wherein:

said step of receiving first input data includes using an input assembly in data communication with the processor for selecting said third portion or said fourth portion of said current virtual reticle, respectively;

said step of receiving second input data includes using said input assembly for actuating a stretching of said selected portion of said current virtual reticle.

11. The system as in claim 10, wherein:

said step of receiving first input data includes using an input assembly in data communication with the processor for selecting said first portion or said second portion of said current virtual reticle, respectively;

said step of receiving second input data includes using said input assembly for requesting a stretching of said selected portion of said current virtual reticle.

12. The system as in claim 11, wherein said current virtual reticle includes:

a third portion displaced a second predetermined distance from said second portion so as to define a third aiming point indicative of a third distance to the target, said third distance being greater than said second distance;

a fourth portion displaced a third predetermined distance from said third portion so as to define a fourth aiming point indicative of a fourth distance to the target, said fourth distance being greater than said third distance.

13. The system as in claim 10, wherein:

if said first and second input data are indicative that said first portion is selected for stretching, then said determining an adjusted virtual reticle includes further displacing said second portion away from said first portion.

14. The system as in claim 12, wherein:

if said first and second input data are indicative that said first portion is selected for stretching, then said determining an adjusted virtual reticle includes further displacing said second portion away from said first portion, again displacing said third portion second predetermined distance away from said second portion, and again displacing said fourth portion said third predetermined distance away from said third portion; and if said first and second input data are indicative that said second portion is selected for stretching, then said determining an adjusted virtual reticle includes further displacing said third portion away from said second portion, and again displacing said fourth portion a third predetermined distance way from said third portion; and if said first and second input data are indicative that said third portion is selected for stretching, then said determining an adjusted virtual reticle includes further displacing said fourth portion away from said third portion.

15. The system is claim 10, wherein said input assembly includes a plurality of input buttons mounted to a scope casing, said plurality of input buttons including a button in communication with the processor for determining said first input data and said second input data.

16. An electronic sighting apparatus capable of selective attachment to a hunting implement, said sighting device comprising:

a casing defining an interior area and an eye hole that enables a hunter to view said interior area and a viewing lens opposite said eye hole;

an electronic display situated in said interior area;

an input assembly coupled to an exterior of said casing;

a processor in data communication with said electronic display and said input assembly for executing program code and a non-transitory computer-readable storage medium containing the program code executable by the processor to perform the steps of:

publishing a current virtual reticle on an electronic display of the electronic device, said current virtual reticle including a first portion defining a first aiming point indicative of a first distance to the target and including a second portion downwardly displaced a first predetermined distance from said first portion so as to define a second aiming point indicative of a second distance to the target;

receiving a request to adjust said published current virtual reticle;

receiving first input data indicative of a user selection of a selectable portion of said published current virtual reticle;

receiving second input data indicative of adjusting a configuration of said current virtual reticle;

determining an adjusted virtual reticle according to said first and said second input data;

publishing said adjusted reticle on said electronic display of the electronic device;

wherein:

said step of receiving first input data includes using an input assembly in data communication with the processor for selecting said first portion or said second portion of said current virtual reticle, respectively; and said step of receiving second input data includes using said input assembly for actuating a stretching of said selected portion of said current virtual reticle.

17. The system as in claim 16, wherein said current virtual reticle includes:

a third portion displaced a second predetermined distance from said second portion so as to define a third aiming point indicative of a third distance to the target, said third distance being greater than said second distance;

a fourth portion displaced a third predetermined distance from said third portion so as to define a fourth aiming point indicative of a fourth distance to the target, said fourth distance being greater than said third distance.

18. The system as in claim 17, wherein:

if said first and second input data are indicative that said first portion is selected for stretching, then said determining an adjusted virtual reticle includes further displacing said second portion away from said first portion, again displacing said third portion second predetermined distance away from said second portion, and again displacing said fourth portion said third predetermined distance away from said third portion; and if said first and second input data are indicative that said second portion is selected for stretching, then said determining an adjusted virtual reticle includes further displacing said third portion away from said second portion, and again displacing said fourth portion a third predetermined distance way from said third portion; and if said first and second input data are indicative that said third portion is selected for stretching, then said determining an adjusted virtual reticle includes further displacing said fourth portion away from said third portion.

* * * * *